United States Patent Office 3,678,001
Patented July 18, 1972

3,678,001
POLYPROPYLENE STABILIZED BY NICKEL SALTS OF N-(HYDROXYALKYLBENZYL) ALKYLENE-POLYAMINES
John Howard Adams, San Rafael, Calif., assignor to Chevron Research Company, San Francisco, Calif.
No Drawing. Continuation-in-part of abandoned application Ser. No. 781,996, Dec. 6, 1968, which is a continuation-in-part of abandoned application Ser. No. 714,773, Mar. 21, 1968. This application Dec. 28, 1970, Ser. No. 102,163
Int. Cl. C08f 45/62
U.S. Cl. 260—45.75 N                5 Claims

ABSTRACT OF THE DISCLOSURE

Substantially crystalline polypropylene stabilized by nickel salts of alkylenepolyamines of the formula:

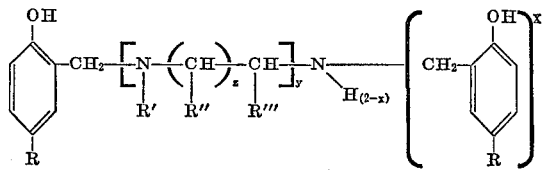

wherein R is an alkyl group of about 5 to about 15 carbon atoms; R' is H or

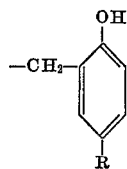

R'' and R''' which may be alike or different are H or alkyl groups having less than 5 carbon atoms; each $z$ is an integer in the range of 1 to 12; $y$ is an integer in the range 1 to 4; and $x$ is 0, 1 or 2.

CROSS REFERENCE TO RELATED APPLICATIONS

This application is a continuation-in-part of John Howard Adams U.S. application Ser. No. 781,996, filed Dec. 6, 1968, now abandoned which in turn is a continuation-in-part of U.S. application Ser. No. 714,773, filed Mar. 21, 1968, now abandoned.

FIELD OF INVENTION

This invention concerns nickel salts of linear alkylenepolyamines in which at least one of the nitrogen atoms is substituted with a hydroxy- and alkyl-substituted benzyl radical and their use as photostabilizers for polypropylene.

BACKGROUND OF THE INVENTION

Nickel salts of various organic compounds are well known hydrocarbon polymer stabilizers. However, many of these nickel stabilizers are prepared from expensive and/or hard to obtain organic compounds. As a result, only two nickel salt stabilizers are known to be commercially available. The first of these stabilizers is the nickel salt of a bis(p-alkylphenol) sulfide. Although these nickel derivatives do confer some degree of stability on polyolefins and are compatible with these polymers, they are not sufficiently effective to protect the polymer from prolonged ultraviolet exposure.

The second commercial stabilizers is a discrete 1:1 molar complex of the previously described nickel salt and an amine, e.g. butyl amine. When mixed with polypropylene this second commercial stabilizer gives superior UV protection as compared to the first stabilizer. However, when polypropylene containing this stabilizer is fabricated into thin sheets or films by a high temperature extrusion process, the nickel:amine complex breaks down and the volatile amine escapes into the atmosphere. Thus, films prepared via extrusion processes have the same UV stability regardless of whether the first type or second type of nickel stabilizer is employed, and no apparent improvement is derived from the complexed amine stabilizer.

It is an object of the present invention to provide a polypropylene-UV stabilizer composition that has the high UV resistance of the previously described complex stabilizer-polypropylene composition both before and after extrusion into thin films.

It is a further object of the invention that the stabilizer portion of the composition be relatively inexpensive and made from readily available starting materials.

DESCRIPTION OF THE INVENTION

The compositions of this invention comprise mixtures of substantially crystalline polypropylene and a nickel salt of a phenolic polyamine stabilizer in a weight ratio of 100:0.01 to 100:5, respectively. The stabilizers of this invention are nickel salts of polyamines having the formula:

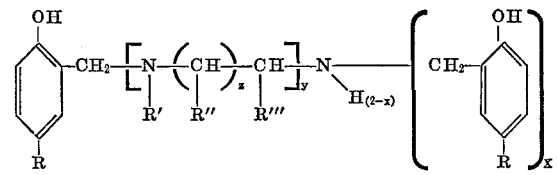

wherein R is an alkyl group of about 5 to about 15 carbon atoms; R' is H or

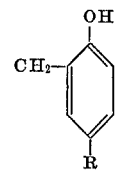

R'' and R''' which may be alike or different are H or alkyl groups having less than 5 carbon atoms each; $z$ is an integer in the range of 1 to 12; $y$ is an integer in the range of 1 to 4; and $x$ is 0, 1 or 2.

The preferred stabilizers are nickel salts of polyamides of the formula:

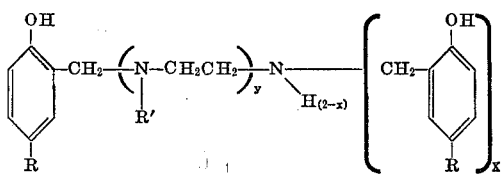

wherein R is alkyl of about 5 to about 15 carbon atoms, R' is H or

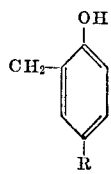

y is an integer in the range of 1 to 4, inclusive, and x is 0, 1 or 2. Preferably, y is 1 or 2. The number of nickel atoms per mol of salt is in the range of about 0.5 to 3.5, inclusive.

The maximum number of 2-hydroxy-5-alkylbenzyl groups is two plus the number of nitrogen atoms in the salt. Thus, there may be 1 to 7 of such groups present. Two of these groups may be attached to a single nitrogen atom. The alkyl groups (R) may be the same or different. They may be branched or straight-chain. Examples of such alkyl groups are pentyl, hexyl, heptyl, octyl, nonyl, decyl, undecyl, dodecyl, tridecyl, tetradecyl and pentadecyl. Preferred R groups are those having 8 to 15 carbon atoms. Salts wherein R is octyl or dodecyl are particularly preferred because of the availability of their phenolic precursors and their superior polymer compatibility and performance as stabilizers.

Salts represented by the above formula are the nickel salts of:

N-(2-hydroxy-5-octylbenzyl) ethylene diamine,
N-(2-hydroxy-5-decylbenzyl) ethylenediamine,
N-(2-hydroxy-5-dodecylbenzyl) ethylenediamine,
N-(2-hydroxy-5-tridecylbenzyl) ethylenediamine,
N,N'-di(2-hydroxy-5-nonylbenzyl) ethylenediamine,
N,N'-di(2-hydroxy-5-dodecylbenzyl) ethylenediamine,
N,N'-di(2-hydroxy-5-pentadecylbenzyl) ethylenediamine,
N-(2-hydroxy-5-octylbenzyl)-N'-(2-hydroxy-5-dodecylbenzyl) ethylenediamine,
1-(2'-hydroxy-5'-octylbenzyl) diethylenetriamine,
1-(2'-hydroxy-5'-undecylbenzyl) diethylenetriamine,
1-(2'-hydroxy-5'-tetradecylbenzyl) diethylenetriamine,
1,4-di(2'-hydroxy-5'-dodecylbenzyl) diethylenetriamine,
1,4-di(2'-hydroxy-5'-pentadecylbenzyl) diethylenetriamine,
1,7-di(2'-hydroxy-5'-decylbenzyl) diethylenetriamine,
1-(2'-hydroxy-5'-tetradecylbenzyl)-4-(2''-hydroxy-5''-octylbenzyl) diethylenetriamine,
1,1,4-tri(2'-hydroxy-5'-dodecylbenzyl) diethylenetriamine,
1,4,7-tri(2'-hydroxy-5'-tridecylbenzyl) diethylenetriamine,
1,4-di-(2'-hydroxy-5'-decylbenzyl)-7-(2''-hydroxy-5''-tetradecylbenzyl) diethylenetriamine,
1,10-di-(2'-hydroxy-5'-pentylbenzyl) triethylenetetraamine,
1,7,13-tri(2'-hydroxy-5'-hexylbenzyl) tetraethylenepentamine,
1,4,7,10,13-penta-(2'-hydroxy-5'-octylbenzyl) tetraethylenepentamine,
1,1,13,13-tetra-(2'-hydroxy-5'-dodecylbenzyltetraethylenepentamine,
1,1,4,7,10,10-hexa(2'-hydroxy-5'-pentylbenzyl) triethylenetetramine and
1-(2'-hydroxy-5'-heptylbenzyl)-4-(2''-hydroxy-5''-nonylbenzyl)-7-(2'''-hydroxy-5'''-undecylbenzyl)-10-2$^{iv}$-hydroxy-5$^{iv}$-tridecylbenzyl)-13-2$^{v}$-hydroxy-5$^{v}$-pentadecylbenzyl) tetraethylenepentamine.

Also included are nickel salts of higher alkylene polyamines as follows:

N,N'-2-hydroxy-5-octylbenzyl) pentane-1,5-diamine;
N-(2-hydroxy-5-decylbenzyl) dodecane-1,12-diamine;
N,N'-(2'-hydroxy-5-dodecylbenzyl) propane-1,2-diamine;
1,4-di(2'-hydroxy-5'-octylbenzyl)-2,5-dimethyldiethylenetriamine;
1,4,7-tri(2'-hydroxy-5-tetradecylbenzyl)-2,5,8-triethyldiethylenetriamine;
N,N,N',N'-tetra(2-hydroxy-5-pentylbenzyl) octane-1,8-diamine.

The salts of this invention may be prepared by first preparing the N-(hydroxyalkylbenzyl) alkylenepolyamine compound and then forming its nickel salt. The ethylenic phenolic polyamines of the above formula may be made by reacting a linear ethylenepolyamine having 1 to 4 ethylene groups and 2 to 5 nitrogen atoms (ethylenediamine, diethylenetriamine, triethylenetetramine and tetraethylenepentamine), with formaldehyde and a p-alkylphenol wherein the alkyl group contains from about 5 to about 15 carbon atoms. In the case of the higher alkylene polyamines the reaction is the same. The addition sequence of the reactants is not critical within reasonable times and temperatures, and in the absence of catalysts. Equimolar amounts of formaldehyde and phenol will be used in the reaction. The number of mols of formaldehyde and alkylphenol per mol of polyamine will be in the range of 1 to 7, inclusive.

The preparation of these N-(hydroxyalkylbenzyl) alkylenepolyamines will normally be carried out at temperatures in the range of about 50 to 100° C. The pressure is not critical—therefore autogenous or atmospheric pressures will be used. This preparation may be carried out neat (without solvents) or with such solvents as benzene, toluene, methanol, ethanol, and carbon tetrachloride.

The nickel salts of the N-(hydroxyalkylbenzyl) alkylene polyamines as illustrated by the nickel salts of N-(hydroxyalkylbenzyl) ethylenepolyamines may be formed by reacting phenolic polyamines with a nickel salt, preferably an inorganic nickel salt. First the N-(hydroxyalkylbenzyl) ethylenepolyamine is neutralized with a base, e.g., sodium methoxide, and then a nickel salt, such as the chloride is added. The resulting organic salt precipitates and is removed by filtration. The byproduct sodium chloride is removed by a water wash.

The nickel compounds formed by the reaction of the N-(hydroxyalkylbenzyl) ethylenepolyamines and a nickel salt have two general type structures. In the first type, both bonds of the divalent nickel are joined to one molecule of the phenolic-amino compound. One form of this internal bonding is illustrated by the following formula:

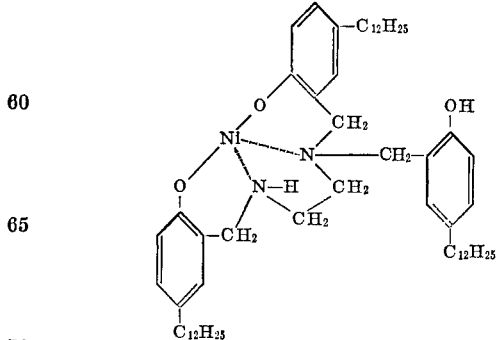

In the second type of compound, the two valences of the nickel atom are satisfied by two different molecules of the phenolic-amino compound. This results in a larger molecular weight than otherwise expected. One form of this interbonding is illustrated by the formula:

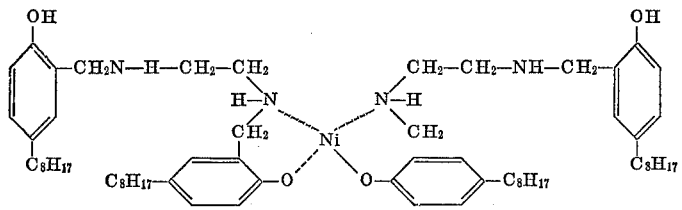

The dotted lines in the above formulas represent nitrogen to nickel coordinate bonds. Many variations of both inter and intra bonding are possible, and these variations permit a wide variation in the molar amount of nickel that may be incorporated in the molecule. At the minimum; with nickel interbonding, one-half mol of nickel combines with one molecule of a phenolic-amino compound. At the other extreme, the number of nickel atoms is one-half the number of phenolic groups in the molecule, e.g., 3.5 nickel atoms in hepta-(2-hydroxy-5-alkylbenzyl) tetra-ethylenepentamine.

The compositions of this invention are readily made by mixing the nickel salts of a phenolic polyamine described above, with polypropylene. Such mixing may be accomplished by blending the salt and finely powdered polypropylene together in a conventional powder blender prior to extrusion. Or the two components may be blended in a conventional melt blending apparatus. These nickel salts of phenolic polyamines are usually incorporated into polypropylene along with other additives such as heat stabilizers, oxidative stabilizers, colors, lubricants and the like. All such additives may be blended in at one time, or they may be added separately.

The nickel salts of phenolic polyamines may be used for UV stabilization of polypropylene at concentrations in the range of 0.01% to 5%, preferably in the range of 0.05 to 0.5% based on polypropylene.

The polypropylene utilized in these compositions is that obtained by polymerizing propylene in the presence of a Ziegler catalyst. This polymeric product is substantially crystalline, stereoregular and is sometimes called isotactic polypropylene. At least 85% of the polypropylene is insoluble in boiling heptane. It is obtained as a powder which may be used as such to blend with the nickel salt of a phenolic polyamine or it may be formed into pellets either by compacting or extrusion.

The following examples illustrative various salts of this invention and a specific method for preparing them. These examples are in no manner intended to limit the invention described herein. Unless otherwise indicated, percentages are by weight.

EXAMPLE I (a) Preparation of di-(2-hydroxy-5-octylbenzyl) ethylenediamine

In a 250-ml. 3-necked flask fitted with stirrer, reflux condenser and addition funnel, 20.6 g. of p-octylphenol was heated to about 90° C. Then 3.0 g. ethylenediamine was added and the mixture stirred for 15 minutes at 80–90° C. Aqueous formaldehyde, 8.1 grams of 37% concentration, was added dropwise at 90° C. The reaction mixture was stirred for two additional hours at about 90° C. At the end of this time a Dean-Stark adapter was inserted in the reflux condenser and benzene was added to the reaction mixture. Water was removed by the azeotropic distillation with benzene. After all of the water was removed, the reaction mixture was poured into a container and dried to a constant weight of 26.6 g. The light yellow, thick, oil-like product had the following element analysis.

Calculated for $C_{32}H_{52}N_2O_2$: C, 77.4; H, 10.5; N, 5.6; M.W., 496. Found: C, 77.5; H, 10.3; N, 5.5; N.W., (ThermoNAM method) 545.

The infrared spectrum of this product had a small peak at 3600 cm.$^{-1}$, a broad peak centered at 3300 cm.$^{-1}$, a large peak at 2940 cm.$^{-1}$ and a medium sized doublet at 1600 cm.$^{-1}$.

An NMR spectrum was obtained of this product dissolved in deuterated chloroform ($CDCl_3$). This spectrum had singlet proton peaks at 0.68, 1.29, 1.64, 2.71, 3.61, 3.84, and 6.23 (broad) and a multiplet at 6.6 to 7.2 p.p.m. in reference to tetramethylsilane. The area under these peaks was proportional to the number of protons in either N,N- or N,N'-di(2-hydroxy-5-octylbenzyl)ethylenediamine. The presence of a peak at 3.6 p.p.m. and at 3.8 p.p.m. (the region of resonance of a proton of a methylene group located between an aryl group and a nitrogen atom) indicates that the product is a mixture of both of these compounds.

A mass spectrum analysis of the product showed that there were two large mass ion peaks at 247 and 476. These peaks result from the following two fragments:

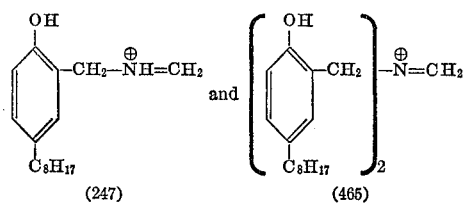

This analysis also indicates that the product of the experiment is a mixture of N,N-di(2-hydroxy-5-octylbenzyl) ethylenediamine and N,N'-di(2-hydroxy-5-octylbenzyl) ethylenediamine.

(b) Preparation of the nickel salt of di(2-hydroxy-5-octylbenzyl) ethylenediamine The product (2.5 g.) of Example 1a was dissolved in methanol containing 0.54 g. sodium methoxide and heated to reflux for one-half hour. After cooling to room temperature, 1.20 g. nickelous chloride hydrate in methanol was added and the mixture was stirred for an additional one-half hour at 25° C. The reaction mixture was then poured into water. The resulting precipitate was filtered and washed with water until no more chloride ion was detected in the wash water by aqueous silver nitrate. The product was then dried to a constant weight of 2.55 g. in a vacuum oven. The resulting light green powder had a M.P. 120–155° C. Its element analysis was:

Calculated for $C_{32}H_{50}N_2O_2Ni$: C, 69.5; H, 9.1; N, 5.1; Ni, 10.6; M.W. 553. Found: C, 67.29; H, 9.49; N, 4.61; Ni, 8.54; M.W. 915.

The infrared spectrum of this salt differs somewhat from that of the parent compound; particularly in the lower intensity of the 3300 cm.$^{-1}$ band and the conversion of the doublet band at 1600 cm.$^{-1}$ to a broad, strong single peak.

Other nickel salts of this invention were prepared by the general method described in Example 1. These nickel salts are listed in Table I.

TABLE I

| Example No. | Polyamine Type | Amt. (g.) | p-Alkylphenol [1] Type | Amt. (g.) | Mole ratio NiCl$_2$·6H$_2$O/ phenolic/polyamine In the reaction | In the product | Mol. wt. | Product analysis (wt. percent) C | H | N | N$_1$ |
|---|---|---|---|---|---|---|---|---|---|---|---|
| 2 | EDA | 6.0 | Octyl | 20.6 | 0.5/1.0/1.0 | 0.8/2.0/1.0 | 830 | 66.3 | 8.7 | 4.8 | 8.2 |
| 3 | EDA | 6.0 | do | 20.6 | 1.0/1.0/1.0 | 1.0/1.7/1.0 | 1,040 | 61.9 | 7.8 | 5.4 | 10.9 |
| 4 | EDA | 1.5 | do | 20.6 | 2.0/4.0/1.0 | 0.9/4.0/1.0 | 1,005 | 71.2 | 9.2 | 3.2 | 6.2 |
| 5 | DETA | 5.16 | do | 20.6 | 1.0/2.0/1.0 | 0.9/2.0/1.0 | 950 | 66.0 | 9.1 | 6.5 | 8.1 |
| 6 | DETA | 10.3 | Dodecyl [2] | 78.6 | 1.0/3.0/1.0 | 1.0/3.0/1.0 | ---- | 74.6 | 10.3 | 4.2 | 5.2 |
| 7 | DETA | 10.3 | do | 78.6 | 1.3/3.0/1.0 | 1.6/3.0/1.0 | 2,440 | 66.6 | 9.1 | 4.3 | 9.4 |
| 8 | DETA | 10.3 | do | 78.6 | 2.0/3.0/1.0 | 1.3/2.1/1.0 | 1,100 | 67.0 | 8.8 | 5.4 | 10.0 |
| 9 | DETA | 10.3 | do | 78.6 | 3.0/3.0/1.0 | 3.0/3.0/1.0 | ---- | 58.6 | 8.7 | 3.3 | 15.3 |
| 10 | TETA | 1.46 | Octyl | 12.35 | 3.0/6.0/1.0 | 1.5/6.0/1.0 | 1,095 | 71.2 | 9.2 | 3.2 | 5.0 |
| 11 | TEPA | 2.85 | do | 10.8 | 2.0/3.5/1.0 | 1.9/4.0/1.0 | 1,320 | 65.6 | 8.6 | 5.3 | 8.3 |
| 12 | TEPA | 2.85 | do | 21.6 | 4.0/7.0/1.0 | 2.5/6.0/1.0 | 1,880 | 67.1 | 8.8 | 4.2 | 8.7 |
| 13 | TEPA | 2.85 | do | 21.6 | 2.0/7.0/1.0 | 1.7/6.0/1.0 | 855 | 70.8 | 9.3 | 4.6 | 6.6 |
| 14 | DPTA | 1.31 | do | 6.18 | 2.0/3.0/1.0 | 2/2/1 | 3,085 | 56.8 | 7.75 | 4.85 | 14.2 |
| 15 | 1,3-PDA | 2.97 | do | 16.5 | 1.0/2.0/1.0 | 1/2/1 | 685 | 64.9 | 8.21 | 4.53 | 9.45 |
| 16 | 1,2-PDA | 2.97 | do | 16.5 | 1.0/2.0/1.0 | 1/2/1 | 1,010 | 64.95 | 9.00 | 4.95 | 10.1 |
| 17 | 1,8-ODA | 1.80 | do | 5.15 | 1.0/2.0/1.0 | 1.6/2/1 | ---- | 65.47 | 9.38 | 4.22 | 14.2 |

[1] 37% Formalin solution used in equal molar amounts to alkyl phenol.
[2] Dodecyl is a propylene tetramer.

NOTE.—EDA=ethylenediamine; DETA=diethylenetriamine; TETA=triethylenetetramine; TEPA=tetraethylenepentamine; DPTA=dipropyl enetriamine; PDA=propanediamine; ODA=octanediamine.

UTILITY

The compositions of this invention have enhanced resistance to photodegradation caused by exposure to ultraviolet light.

The compositions prepared from the nickel salts described above were tested for UV stability by the following procedure. 0.010 g. of 2,6-di-t-butyl-p-cresol and 0.050 g. of the nickel stabilizer were dissolved in acetone and poured into 10.0 g. of a commercial, unstabilized polypropylene powder. The slurry was stirred thoroughly until absolutely dry. The slurry was then mold pressed at 475° F. and up to 30,000 p.s.i. into a 20 mil sheet. This sheet was cut into 1-inch by 2-inch samples which were exposed to an ultraviolet energy source (450 watt mercury vapor lamp). The samples were periodically examined in the 1800–1600 cm.$^{-1}$ region of the infrared spectrum for carbonyl (oxidation) buildup using an unexposed sample in the reference beam. The sample was also periodically flexed to determine whether it had failed by embrittlement. Table II reports the results of these tests. For comparison, a sample without an ultraviolet light stabilizer and samples of other phenolic nickel salts were also tested by the above procedure. These comparison tests are reported in Table II.

TABLE II

| Salt | Carbonyl buildup (Infrared absorbance) 30 hrs. | 100 hrs. | Hours to brittle failure |
|---|---|---|---|
| Ex. No.: | | | |
| 1 | 0 | .20 | 260 |
| 2 | 0 | .15 | 295 |
| 3 | 0 | .20 | 195 |
| 4 | 0 | .80 | 163 |
| 5 | .02 | .40 | 114 |
| 6 | .03 | .61 | 115 |
| 7 | .05 | 00 | 119 |
| 8 | .05 | .80 | 115 |
| 9 | .03 | ---- | 95 |
| 10 | 0 | ---- | 70 |
| 11 | .04 | ---- | 82 |
| 12 | 0 | .10 | 232 |
| 13 | 0 | .10 | 185 |
| 14 | 0 | .90 | 143 |
| 15 | 0 | .40 | 139 |
| 16 | 0 | .35 | 144 |
| 17 | .08 | ---- | 66 |
| No UV light stabilizer | .40 | ---- | 30 |
| Commercial [1] | .30 | ---- | 50 |
| Ni salt of p-octyl phenol | .40 | ---- | 28 |

[1] The nickel salt of bis(p-octylphenol) sulfide.

The polypropylene-nickel salt compositions of the present invention have even greater UV stability when combined with stabilizers. For instance, polypropylene containing the nickel salts described above with 2-hydroxy-4-octyloxybenzophenone or 2-(2'-hydroxy-3',5'-di-t-butylphenol)-5-chlorobenzotriazole gave better UV stability than the nickel salts alone at equal concentrations.

The superiority of the present compositions as to UV stability after extrusion is shown by the following comparative examples. Molded sheets were prepared as described above using the same quantities of polypropylene (PP), 2,6-di-t-butyl-p-cresol (BHT), and the nickel salts. Strips from these sheet were exposed to a mercury lamp, and the hours to flexural failure were determined. The results are follows:

Test composition: Flexural failure, hrs.
No nickel salt _____ 30
A nickel alkylphenol sulfide _____ 50
A nickel:amine complex _____ 240
Product of Example 1 _____ 260
Product of Example 12 _____ 232

The above test strips were prepared by a molding operation and polypropylene containing the commercial nickel:amine complex stabilizer had the superior properties. The compositions of the present invention are essentially equivalent.

For the purpose of further comparison polypropylene (containing 0.1% of 2,6-di-t-butyl-p-cresol, 0.5% of 2-hydroxy-4-octyloxybenzophenone and a green pigment) was mixed with 0.2% of several test compounds. Then each stabilized polypropylene composition was charged to a conventional heated extruder and extruded as a film at 360° C. onto a chill roll. The film was then stretched to about 7 times its original length at a temperature of about 270° C. Next the film was cut into narrow strips about an inch wide which were fibrillated by contact with a point-covered roller (see U.S. Pat. 3,496,259). The resulting fibrillated strips were twisted into yarns which were then exposed to outdoor weathering in Arizona, Florida, and the San Francisco Bay region. Periodically the yarns were tested for Instron tensile strength in grams per denier, and the percent strength retention was calculated on the basis of the original, unexposed yarn strength. This test simulates the conditions to be met by an indoor-outdoor carpet yarn. The results were as follows:

| Test composition | Strength retention, percent 9 months Arizona | 12 months Florida | 12 months San Francisco |
|---|---|---|---|
| No nickel salt | 0 | 0 | 27 |
| A nickel alkylphenol sulfide | 15 | 16 | 29 |
| A nickel:amine complex | 15 | 0 | 24 |
| The product of Example 1 | 24 | 27 | 37 |
| The product of Example 12 | 39 | 29 | 41 |

The results clearly show the great superiority of the present composition to outdoor weathering and UV exposure, as compared to other stabilizer compositions.

While the chamber of this invention has been described in detail with numerous examples, this has been done by way of illustration only and without limitation of the invention. It will be apparent to those skilled in the art that modifications and variations of the illustrative examples may be made in the practice of the invention within the scope of the following claims.

I claim:
1. Composition comprising normally solid, substantially crystalline polypropylene and a minor proportion of 2-hydroxy-4-octyloxybenzophenone or 2-(2'-hydroxy-3',5'-di-t-butylphenol)-5-chlorobenzotriazole in stabilizing amounts in combination with nickel salt of polyamine having the following formula:

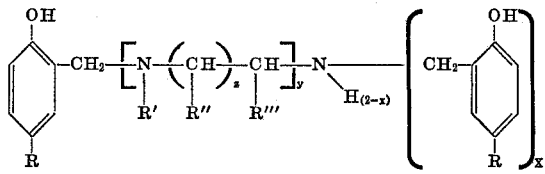

wherein R is an alkyl group of about 5 to about 15 carbon atoms; R' is H or

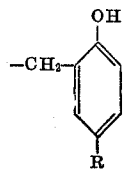

R" and R'" which may be alike or different are H or alkyl groups having less than 5 carbon atoms each; $z$ is an integer in the range of 1 to 12; $y$ is an integer in the range of 1 to 4; and $x$ is 0, 1 or 2; said nickel salt being in an amount sufficient to enhance the photostability of the polypropylene, and the divalent metal of said salt being principal valence bonded entirely to the phenolic oxygen.

2. Composition according to claim 1 in which the nickel salt is present in an amount from about 0.05 to about 0.5 weight percent of the composition.

3. Composition according to claim 2 in which R" and R'" are H and $z$ is 1.

4. Composition according to claim 3 in which $x$ is 1.

5. Composition according to claim 4 in which $y$ is 1 and R is octyl.

References Cited

FOREIGN PATENTS 994,260   6/1965   Great Britain _____ 260—45.75

DONALD E. CZAJA, Primary Examiner

V. P. HOKE, Assistant Examiner

U.S. Cl. X.R.

260—45.8 A, 45.95